United States Patent
Kim et al.

(10) Patent No.: US 9,771,919 B2
(45) Date of Patent: Sep. 26, 2017

(54) ENERGY ENHANCED IGNITION SYSTEM HAVING LEAN PRE-COMBUSTION

(71) Applicant: Caterpillar Inc., Peoria, IL (US)

(72) Inventors: Arnold Myoungjin Kim, West Peoria, IL (US); James M. Schultz, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 193 days.

(21) Appl. No.: 14/795,908

(22) Filed: Jul. 10, 2015

(65) Prior Publication Data

US 2017/0009730 A1 Jan. 12, 2017

(51) Int. Cl.

| | |
|---|---|
| *F02P 9/00* | (2006.01) |
| *F02B 19/10* | (2006.01) |
| *F02B 19/12* | (2006.01) |
| *F02P 13/00* | (2006.01) |
| *F02P 23/04* | (2006.01) |
| *F02P 3/00* | (2006.01) |

(52) U.S. Cl.
CPC ............. *F02P 9/002* (2013.01); *F02B 19/108* (2013.01); *F02B 19/12* (2013.01); *F02P 9/007* (2013.01); *F02P 13/00* (2013.01); *F02P 23/04* (2013.01); *F02P 3/00* (2013.01); *F02P 23/045* (2013.01)

(58) Field of Classification Search
CPC .......... F02P 9/002; F02P 13/00; F02P 23/045; F02B 19/108; F02B 19/12
See application file for complete search history.

(56) References Cited

U.S. PATENT DOCUMENTS

| | | | | |
|---|---|---|---|---|
| 2,117,422 | A | * | 5/1938 | Holthouse ............... F02P 9/002 315/220 |
| 2,158,634 | A | * | 5/1939 | McMurtry ............... F02P 15/12 123/179.3 |
| 4,384,480 | A | | 5/1983 | Krage et al. |
| 4,492,114 | A | | 1/1985 | Yamanaka et al. |
| 5,655,210 | A | | 8/1997 | Gregoire et al. |
| 6,883,507 | B2 | | 4/2005 | Freen |
| 7,493,886 | B2 | | 2/2009 | Blank |

(Continued)

FOREIGN PATENT DOCUMENTS

| | | |
|---|---|---|
| CN | 202924719 | 5/2013 |
| JP | 2014-43841 | 3/2014 |

*Primary Examiner* — Joseph Dallo
(74) *Attorney, Agent, or Firm* — Finnegan, Henderson, Farabow, Garrett & Dunner, LLP

(57) ABSTRACT

An ignition system for use with an engine is disclosed. The ignition system may have a pre-combustion chamber in fluid communication with a combustion chamber associated with the engine, and a fuel injection device configured to inject a fuel mixture directly into the pre-combustion chamber. The ignition system may also have a spark plug configured to ignite the fuel mixture within the pre-combustion chamber, and a controller in communication with a primary energy supply and an enhanced energy supply. The controller may be configured to direct a first current from the enhanced energy supply to the spark plug after the fuel mixture is injected into the pre-combustion chamber. The controller may also be configured to direct a second current from the primary energy supply to the spark plug just after the first current is being directed to the spark plug. The second current may have a frequency that is lower than the first current.

17 Claims, 2 Drawing Sheets

(56) References Cited

U.S. PATENT DOCUMENTS

| | | | |
|---|---|---|---|
| 7,743,753 | B2 | 6/2010 | Fiveland et al. |
| 7,770,552 | B2 | 8/2010 | Schultz |
| 8,104,444 | B2 | 1/2012 | Schultz |
| 8,181,617 | B2 | 5/2012 | Kuhnert et al. |
| 8,420,021 | B2 | 4/2013 | Makita et al. |
| 8,499,746 | B2 | 8/2013 | Ikeda et al. |
| 8,800,537 | B2 | 8/2014 | Ikeda |
| 8,857,396 | B2 | 10/2014 | Giffels et al. |
| 8,863,495 | B2 | 10/2014 | Ikeda |
| 8,910,619 | B2 | 12/2014 | Gingrich et al. |
| 2009/0031984 | A1* | 2/2009 | Shiraishi ................ F02P 9/007 123/260 |
| 2009/0107437 | A1 | 4/2009 | Schultz |
| 2014/0080077 | A1* | 3/2014 | Frontczak ............... H01T 13/44 431/258 |
| 2016/0102648 | A1* | 4/2016 | Nakayama ............ F02P 3/0838 123/604 |

* cited by examiner

ENERGY ENHANCED IGNITION SYSTEM HAVING LEAN PRE-COMBUSTION

TECHNICAL FIELD

The present disclosure relates generally to an ignition system and, more particularly, to an energy enhanced ignition system having a lean pre-combustion.

BACKGROUND

Engines, including diesel engines, gasoline engines, gaseous fuel powered engines, and other engines known in the art ignite or admit an air and fuel mixture to produce heat. In one example, fuel directed into a combustion chamber of the engine can be ignited by way of a spark plug. The heat and expanding gases resulting from this combustion process are directed to displace a piston or move a turbine blade, both of which can be connected to a crankshaft of the engine. As the piston is displaced or the turbine blade is moved, the crankshaft is caused to rotate. This rotation is then utilized to drive a device such as a transmission or a generator to propel a vehicle or to produce electrical power.

During operation of the engine described above, a complex mixture of air pollutants is produced as a byproduct of the combustion process. These air pollutants are composed of solid particulate matter and gaseous compounds including nitrous oxides (NOx). Due to increased attention on the environment, exhaust emission standards have become more stringent and the amount of solid particulate matter and gaseous compounds emitted to the atmosphere from an engine is regulated depending on the type of engine, size of engine, and/or class of engine.

One method that has been implemented by engine manufacturers to reduce the production of these pollutants is to introduce a lean air/fuel mixture into the combustion chambers of the engine. This lean mixture, when ignited, burns at a relatively low temperature. The lowered combustion temperature slows the chemical reaction of the combustion process, thereby decreasing the formation of regulated emission constituents. As emission regulations become stricter, leaner and leaner mixtures are being implemented.

Although successful at reducing emissions, very lean air/fuel mixtures are difficult to ignite. That is, the single point arc from a conventional spark plug may be insufficient to initiate and/or maintain combustion of a mixture that has little fuel (compared to the amount of air present). As a result, the emission reduction available from a typical spark-ignited engine operated in a lean mode may be limited.

One attempt at improving combustion initiation of a lean air/fuel mixture is described in U.S. Pat. No. 8,104,444 (the '444 patent) issued to Schultz on Jan. 31, 2012. The '444 patent discloses an igniter including a body and a pre-combustion chamber integral with the body and having at least one orifice. The igniter also includes at least one electrode associated with the pre-combustion chamber. The at least one electrode is configured to direct high frequency electromagnetic energy (RF energy) to lower an ignition breakdown voltage requirement of an air and fuel mixture in the pre-combustion chamber. The at least one electrode is also configured to generate an arc that extends to an internal wall of the pre-combustion chamber and ignites the air and fuel mixture. The use of RF energy may facilitate combustion of a lean air and fuel mixture in a main combustion chamber.

Although the igniter of the '444 patent helps to provide a more consistent and reliable combustion, improvements may still be possible. Specifically, the air and fuel mixture in the pre-combustion chamber of the '444 patent could be leaner, which would further reduce the formation of regulated emission constituents.

The disclosed ignition system is directed to overcoming one or more of the problems set forth above and/or other problems of the prior art.

SUMMARY

In one aspect, the present disclosure is directed to an ignition system for an engine. The ignition system may include a pre-combustion chamber in fluid communication with a combustion chamber associated with the engine, and a fuel injection device configured to inject a fuel mixture directly into the pre-combustion chamber. The ignition system may also include a spark plug configured to ignite the fuel mixture within the pre-combustion chamber, and a controller in communication with a primary energy supply and an enhanced energy supply. The controller may be configured to direct a first current from the enhanced energy supply to the spark plug after the fuel mixture is injected into the pre-combustion chamber. The controller may also be configured to direct a second current from the primary energy supply to the spark plug. The second current may have a frequency that is lower than the first current.

In another aspect, the present disclosure is directed to a method of initiating combustion within an engine. The method may include injecting a first fuel mixture directly into a pre-combustion chamber associated with the engine. The method may also include directing a first current from an enhanced energy supply to a spark plug associated with the pre-combustion chamber, and directing a second current from a primary energy supply to the spark plug. The second current may have a frequency that is lower than the first current. The method may further include igniting the first fuel mixture in the pre-combustion chamber. The method may further include injecting a second fuel mixture into a main combustion chamber associated with the engine, and igniting the second fuel mixture within the main combustion chamber.

In yet another aspect, the present disclosure is directed to an engine. The engine may include an engine block at least partially defining a cylinder, and a piston reciprocatingly disposed within the cylinder to form a combustion chamber. The engine may also include a pre-combustion chamber in fluid communication with the combustion chamber, a first fuel injection device configured to direct a first fuel mixture directly into the pre-combustion chamber, and a spark plug configured to ignite the first fuel mixture within the pre-combustion chamber. The engine may further include an enhanced energy supply configured to direct a first current to the spark plug, and a primary energy supply configured to direct a second current to the spark plug. The second current may have a frequency that is lower than the first current. The engine may further include a controller in communication with the primary energy supply and the enhanced energy supply, and configured to direct the first current to the spark plug after the first fuel mixture is injected into the pre-combustion chamber; and direct the second current to the spark plug. The engine may further include a second fuel injection device configured to direct a second fuel mixture at a location upstream of the combustion chamber to intersect with a plurality of flame jets emitted from the pre-combustion chamber as a result of ignition of the first fuel mixture within the pre-combustion chamber.

DETAILED DESCRIPTION

Figure 1:
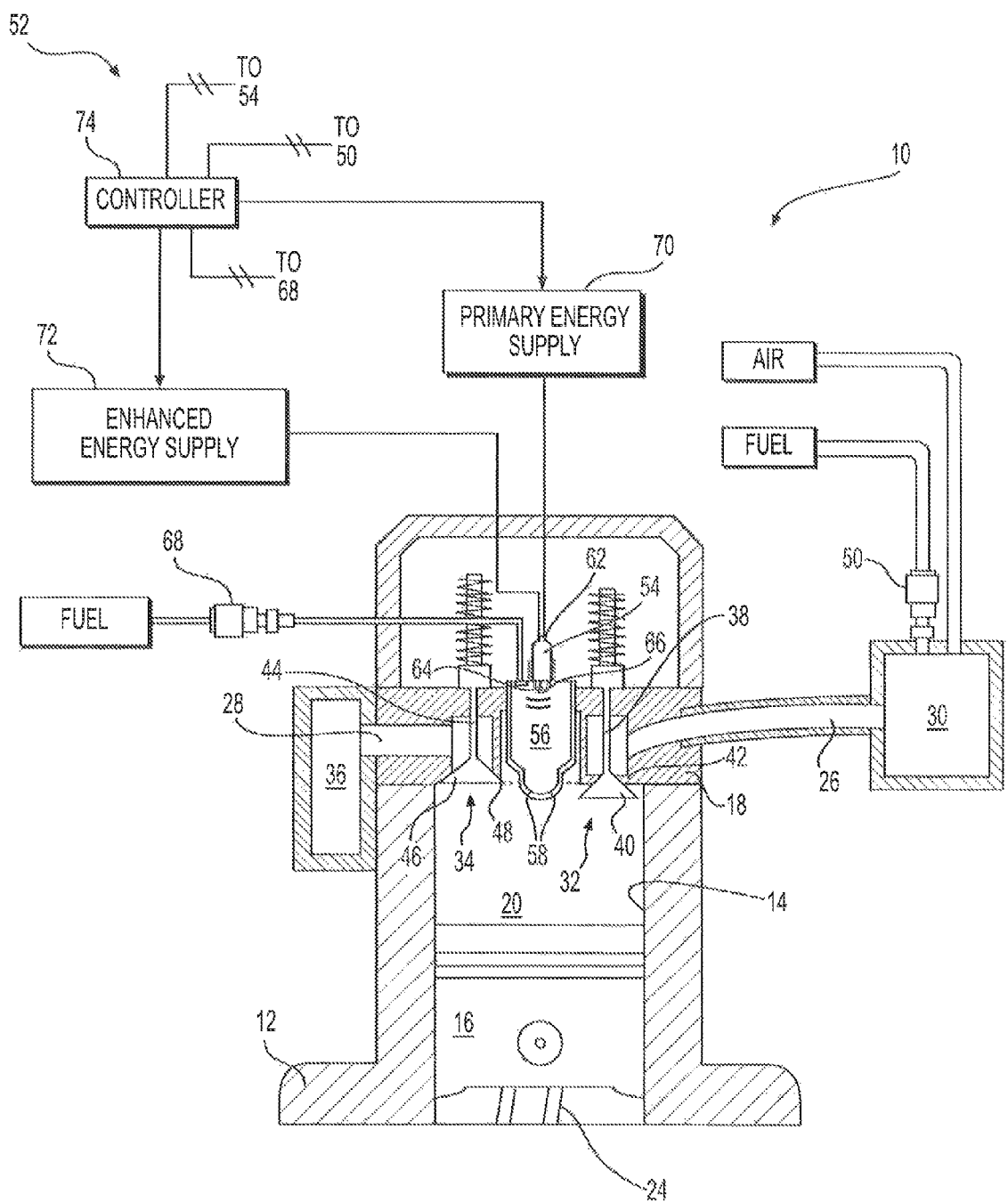
FIG. 1 is a diagrammatic illustration of an exemplary disclosed engine.

FIG. 1 illustrates an exemplary combustion engine 10. For the purposes of this disclosure, engine 10 is depicted and described as a four-stroke gaseous-fueled engine, for example a natural gas engine. One skilled in the art will recognize, however, that engine 10 may be any other type of combustion engine such as, for example, a gasoline-fueled engine or a dual-fuel (e.g., a natural gas and diesel-fueled) engine. Engine 10 may include an engine block 12 that at least partially defines one or more cylinders 14 (only one shown in FIG. 1). A piston 16 may be slidably disposed within each cylinder 14 to reciprocate between a top-dead-center (TDC) position and a bottom-dead-center (BDC) position, and a cylinder head 18 may be associated with each cylinder 14. Cylinder 14, piston 16, and cylinder head 18 may together define a combustion chamber 20. It is contemplated that engine 10 may include any number of combustion chambers 20 and that combustion chambers 20 may be disposed in an "in-line" configuration, in a "V" configuration, in an "opposing piston" configuration, or in any other suitable configuration.

Engine 10 may also include a crankshaft (not shown) that is rotatably disposed within engine block 12. A connecting rod 24 may connect each piston 16 to the crankshaft so that a sliding motion of piston 16 between the TDC and BDC positions within each respective cylinder 14 results in a rotation of the crankshaft. Similarly, a rotation of the crankshaft may result in a sliding motion of piston 16 between the TDC and BDC positions. In a four-stroke engine, piston 16 may reciprocate between the TDC and BDC positions through an intake stroke, a compression stroke, a combustion or power stroke, and an exhaust stroke. It is also contemplated that engine 10 may alternatively be a two-stroke engine, wherein a complete cycle includes a compression/exhaust stroke (BDC to TDC) and a power/exhaust/intake stroke (TDC to BDC).

Cylinder head 18 may define an intake passageway 26 and an exhaust passageway 28. Intake passageway 26 may direct compressed air or an air/fuel mixture from an intake manifold 30, through an intake opening 32, and into combustion chamber 20. Exhaust passageway 28 may similarly direct exhaust gases from combustion chamber 20, through an exhaust opening 34, and into an exhaust manifold 36. In some embodiments, a turbocharger (not shown) may be driven by the exhaust exiting manifold 36 to compress the air entering manifold 30.

An intake valve 38 having a valve element 40 may be disposed within intake opening 32 and configured to selectively engage a seat 42. Intake valve 38 may be movable between a first position, at which valve element 40 engages seat 42 to inhibit a flow of fluid relative to intake opening 32, and a second position, at which valve element 40 is removed from seat 42 to allow the flow of fluid.

An exhaust valve 44 having a valve element 46 may be similarly disposed within exhaust opening 34 and configured to selectively engage a seat 48. Valve element 46 may be movable between a first position, at which valve element 46 engages seat 48 to inhibit a flow of fluid relative to exhaust opening 34, and a second position, at which valve element 46 is removed from seat 48 to allow the flow of fluid.

A series of valve actuation assemblies (not shown) may be operatively associated with engine 10 to move valve elements 40 and 46 between the first and second positions. It should be noted that each cylinder head 18 could include multiple intake openings 32 and multiple exhaust openings 34. Each such opening would be associated with either an intake valve element 40 or an exhaust valve element 46. Engine 10 may include a valve actuation assembly for each cylinder head 18 that is configured to actuate all of the intake valves 38 or all of the exhaust valves 44 of that cylinder head 18. It is also contemplated that a single valve actuation assembly could actuate the intake valves 38 or the exhaust valves 44 associated with multiple cylinder heads 18, if desired. The valve actuation assemblies may embody, for example, a cam/push-rod/rocker arm arrangement, a solenoid actuator, a hydraulic actuator, or any other means for actuating known in the art.

A fuel injection device 50 may be associated with engine 10 to direct pressurized fuel into combustion chamber 20. Fuel injection device 50 may embody, for example, an electronic valve situated at a location upstream of intake manifold 30. It is contemplated that fuel injection device 50 could alternatively embody a hydraulically, mechanically, or pneumatically actuated device that selectively pressurizes and/or allows pressurized fuel to pass directly into combustion chamber 20 or in another manner. The fuel may include a compressed gaseous fuel such as, for example, natural gas, propane, bio-gas, landfill gas, or hydrogen. It is also contemplated that the fuel may be liquefied, for example, gasoline, diesel, methanol, ethanol, or any other liquid fuel may be injected into combustion chamber 20, and that an onboard pump (not shown) may be required to pressurize the fuel.

The amount of fuel output by fuel injection device 50 may be associated with a ratio of air-to-fuel introduced into combustion chamber 20. For example, it may be desirable to introduce a stoichiometric mixture of air and fuel (mixture having just enough air to completely burn off an amount of fuel) into combustion chamber 20. However, in other embodiments, if it is desired to introduce a lean mixture of air and fuel (mixture having a relatively low amount of fuel compared to the amount of air) into combustion chamber 20, fuel injection device 50 may remain in an injecting position for a shorter period of time (or otherwise be controlled to inject less fuel per given cycle) than if a rich mixture of fuel and air (mixture having a relatively large amount of fuel compared to the amount of air) is desired. Likewise, if a rich mixture of air and fuel is desired, fuel injection device 50 may remain in the injecting position for a longer period of time (or otherwise be controlled to inject more fuel per given cycle) than if a lean mixture is desired.

As shown in FIG. 1, an ignition system 52 may be associated with engine 10 to help regulate the combustion of the air/fuel mixture within combustion chamber 20. Ignition system 52 may include a spark plug 54 and a pre-combustion chamber 56 associated with combustion chamber 20. Spark plug 54 may be configured to facilitate ignition of a mixture of air and fuel within pre-combustion chamber 56. Pre-combustion chamber 56 may be in fluid communication with combustion chamber 20 via one or more orifices 58. It is contemplated that any number of orifices 58 may be included within pre-combustion chamber 56. Although shown as separate components in FIG. 1, it is contemplated that spark plug 54 and pre-combustion chamber 56 may instead be a single integral unit, such as, for example, a pre-chamber spark plug.

Spark plug 54 may have an electrode 62 extending through a body of spark plug 54 and at least partially into pre-combustion chamber 56. Electrode 62 may be fabricated from an electrically conductive metal such as, for example, tungsten, iridium, silver, platinum, and gold palladium, and be configured to direct current from one or more power supplies to ionize (i.e., create a corona within) the air/fuel mixture of pre-combustion chamber 56 in order to ignite the air/fuel mixture. In the disclosed embodiment, a portion of electrode 62 extends at least partially into pre-combustion chamber 56 to form a spark end 64. Spark end 64 may be positioned proximate to a ground electrode 66, such that current from the power supplies may travel through electrode 62 and then from spark end 64 to ground electrode 66, in order to create a spark to ignite the air/fuel mixture within pre-combustion chamber 56.

In the disclosed embodiment, a second fuel injection device 68 is disposed to direct pressurized fuel into pre-combustion chamber 56 and initiate combustion within pre-combustion chamber 56. It is contemplated that, in some embodiments, fuel injection device 68 may be substantially similar to fuel injection device 50. After ignition within pre-combustion chamber 56, one or more flame jets may pass from pre-combustion chamber 56 through orifices 58 and into combustion chamber 20, thereby igniting the air/fuel mixture within combustion chamber 20. The flame jets may pass into combustion chamber 20 as piston 16 nears TDC during the compression stroke, as piston 16 leaves TDC during the power stroke, or at another appropriate time. By injecting fuel into pre-combustion chamber 56 instead of directly within combustion chamber 20, this may allow a leaner air/fuel mixture within combustion chamber 20. However, in traditional engines where fuel is injected directly into a pre-combustion chamber, the pre-combustion chamber typically has a much richer air/fuel mixture, which can still lead to undesirable amounts of emissions.

Thus, in order to further reduce emissions from engine 10, the disclosed ignition system 52 provides a leaner air/fuel mixture within pre-combustion chamber 56. To accomplish this, ignition system 52 utilizes both a primary energy supply 70 and an enhanced energy supply 72 for initiating combustion within pre-combustion chamber 56. Ignition system 52 may further include a controller 74 in communication with spark plug 54, fuel injection device 68, primary energy supply 70, and/or enhanced energy supply 72 to regulate the combustion process in pre-combustion chamber 56.

Primary energy supply 70 may include, among other things, a high voltage source of DC power as is typical in most spark-ignited, combustion engine applications. In one embodiment, multiple high voltage sources may be present, with one high voltage source being paired with each spark plug 54. In another embodiment, a single high voltage source of DC power may be utilized for all spark plugs 54. In this configuration, a distributor (not shown) may be located between the high voltage source and spark plugs 54 to selectively distribute power to each spark plug 54 at an appropriate timing relative to the motion of each piston 16. Primary energy supply 70 may generate a high voltage pulsed DC current having a frequency in a range much lower than a range provided by enhanced energy supply 72 (i.e., in a range of about 0-50 kHz), and direct this current to spark plugs 54.

Enhanced energy supply 72 may include one or more of a microwave energy source, a plasma energy source, or another enhanced energy source known in the art. Enhanced energy supply 72 may receive an electrical current from a battery power supply (not shown) or an alternator (not shown) and transform the current to an energy level usable by spark plugs 54 to ionize (i.e., create a corona in) an air and fuel mixture. For the purposes of this disclosure, enhanced energy may be considered electromagnetic energy having a frequency in a range of about 0.3-300 GHz. Enhanced energy supply 72 may transform the low voltage current from the battery power supply or alternator to enhanced energy through the use of microwave devices, plasma devices, and other devices known in the art.

Controller 74 may embody a single or multiple microprocessor controllers, field programmable gate arrays (FPGAs), digital signal processors (DSPs), etc., that is configured to control one or more aspects of the operation of engine 10. For example, controller 74 may be programmed to control spark plug 54, fuel injection device 68, primary energy supply 70, and/or enhanced energy supply 72. Controller 74 may control spark plug 54, fuel injection device 68, primary energy supply 70, and/or enhanced energy supply 72 by transmitting signals, such as, for example, currents, to control spark plug 54, fuel injection device 68, primary energy supply 70, and/or enhanced energy supply 72. The transmitted signals may result in actuation of spark plug 54, fuel injection device 68, primary energy supply 70, and/or enhanced energy supply 72. In some embodiments, controller 74 may control spark plug 54, fuel injection device 68, primary energy supply 70, and/or enhanced energy supply 72 based on current operating conditions of engine 10, one or more maps relating to ignition system parameters stored in the memory of controller 74 (e.g., fuel injection and/or spark timings), and/or information received from one or more sensors (not shown) strategically located throughout engine 10. In some embodiments, controller 74 may also be programmed to control fuel injection device 50. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

In some embodiments, controller 74 may be configured to direct a first current from enhanced energy supply 72 to electrode 62 of spark plug 54 after fuel has been injected into pre-combustion chamber 56 via fuel injection device 68. Controller 74 may also be configured to direct a second current from primary energy supply 70 to electrode 62 of spark plug 54 just before, during, or just after the first current is directed to electrode 62 of spark plug 54. In one embodiment, controller 74 may direct the second current to electrode 62 just after the first current is directed to electrode 62. Providing both the first and second current to electrode 62 of spark plug 54 may enhance the ignition energy in pre-combustion chamber 56.

The use of enhanced energy may create a stronger corona within pre-combustion chamber 56 than in operations using only the primary energy source typically used in spark-ignition engines. As a result, less fuel is needed to be provided by fuel injection device 68 in order to achieve a desired combustion within pre-combustion chamber 56. In particular, controller 74 may be configured to actuate fuel injection device 68 to cause an air-fuel equivalence ratio (λ) of pre-combustion chamber 56 to be about 1.6-1.7 immediately before ignition of the air/fuel mixture within pre-combustion chamber 56. Without the use of enhanced energy, an air-fuel equivalence ratio of less than about 1.3 may be required to achieve the desired combustion within pre-combustion chamber 56. Thus, a leaner air/fuel mixture in pre-combustion chamber 56 may be provided, which results in reduced emissions from engine 10.

The use of enhanced energy may also be used to lower the required spark voltage of spark plug 54. For example, in some embodiments, the supply of the first current from enhanced energy supply 72 may be stopped just prior to the second current from primary energy supply 70 is supplied. The first current may ionize an area around spark plug 54 (e.g., proximate to spark end 64), which allows spark plug 54 to ignite at a lower voltage via the second current, thereby extending the life of spark plug 54.

Figure 2:
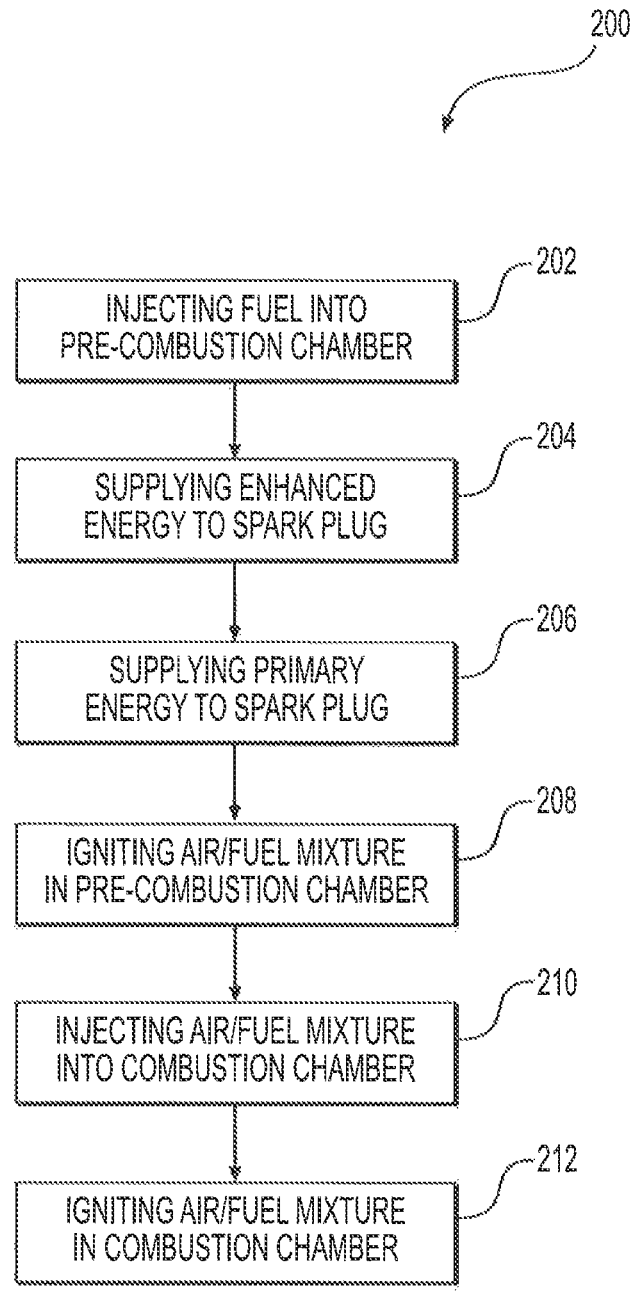
FIG. 2 is a flowchart depicting an exemplary disclosed method that may be performed by the engine of FIG. 1.

FIG. 2 is a flowchart depicting an exemplary disclosed method 200 that may be performed by the engine of FIG. 1. FIG. 2 will be discussed in more detail below to further illustrate the disclosed concepts.

INDUSTRIAL APPLICABILITY

The disclosed ignition system may be applicable to any combustion engine where a lean-burn, low-$NO_X$ producing engine is desired. In particular, the disclosed ignition system may provide a leaner pre-combustion chamber 56 by reducing fuel injected into pre-combustion chamber 56 and providing enhanced energy to ignite the fuel within pre-combustion chamber 56. The leaner pre-combustion chamber 56 may allow engine 10 to produce lower levels of regulated exhaust constituents than engines with traditional richer pre-combustion chambers. The operation of engine 10 will now be explained.

Referring to FIG. 2, fuel may be injected into pre-combustion chamber 56, at step 202. Specifically, at an appropriate timing relative to the motion of piston 16 within combustion chamber 20, as detected or determined by controller 74, controller 74 may cause fuel injection device 68 to inject fuel into pre-combustion chamber 56. In some applications, controller 74 may actuate fuel injection device 68 based on current operating conditions of engine 10, one or more maps relating to fuel system parameters stored in the memory of controller 74 (e.g., fuel injection timings), and/or information received from one or more sensors (not shown) strategically located throughout engine 10. In one application, the amount of fuel injected into pre-combustion chamber 56 may be substantially less than an amount of fuel injected when enhanced energy is not being used. Specifically, the air-fuel equivalence ratio $\lambda$ of pre-combustion chamber 56 may be about 1.6-1.7 immediately before ignition of the air/fuel mixture within pre-combustion chamber 56. The injected fuel within pre-combustion chamber 56 may mix with air and/or fuel entering pre-combustion chamber 56 via orifices 58 during an intake and/or compression stroke of piston 16.

At step 204, at an appropriate timing relative to the motion of piston 16 within combustion chamber 20, as detected or determined by controller 74, controller 74 may control enhanced energy supply 72 to direct a first current to electrode 62 of spark plug 54. The first current, having a frequency within the enhanced energy range, may generate a corona within pre-combustion chamber 56.

At step 206, just before, during, or just after the enhanced energy is directed into pre-combustion chamber 56, controller 74 may control primary energy supply 72 to direct a second current to electrode 62 of spark plug 54. It is contemplated that, in some embodiments, there may be a second, separate electrode in which the second current is directed instead of the first and second current being directed to the same electrode. The second current, having a frequency that is lower than the enhanced energy range, may produce a high temperature arc that extends outward from electrode 62, towards the internal walls of pre-combustion chamber 56, causing the air/fuel mixture within pre-combustion chamber 56 to be ignited, at step 208. As the air/fuel mixture ignites within pre-combustion chamber 56, flame jets may propagate through orifices 58 into combustion chamber 20.

At step 210, either before or after the emission of the flame jets into combustion chamber 20, a mixture of air and fuel may be injected into combustion chamber 20 via intake passageway 26. It is contemplated that, in some embodiments, the air/fuel mixture may be injected into combustion chamber 20 prior to fuel being injected in pre-combustion chamber 56. More specifically, controller 74 may cause fuel injection device 50 to inject fuel at a location upstream of combustion chamber 20, where it is mixed with air and introduced into combustion chamber 20. In some embodiments, fuel may be injected into intake passageway 26, while in other embodiments, fuel may be injected directed into combustion chamber 20. In some applications, controller 74 may directly control fuel injection device 50 based on current operating conditions of engine 10, one or more maps relating to fuel system parameters stored in the memory of controller 74 (e.g., fuel injection timings), and/or information received from one or more sensors (not shown) strategically located throughout engine 10. At step 212, the air/fuel mixture within combustion chamber 20 may be ignited by the intersecting flame jets from pre-combustion chamber 56 to produce a mechanical work output and an exhaust flow of hot gases.

Because the disclosed ignition system utilizes enhanced energy during ignition, less fuel may be required in the pre-combustion chamber to initiate combustion. Less fuel in the pre-combustion chamber may allow the pre-combustion chamber to operate with a leaner air/fuel mixture, resulting in lower emissions produced by the engine. As a result, the disclosed ignition system may achieve similar performance as in traditional engines, while achieving lower levels of regulated exhaust constituents and providing fuel cost savings.

It will be apparent to those skilled in the art that various modifications and variations can be made to the disclosed ignition system. Other embodiments will be apparent to those skilled in the art from consideration of the specification and practice of the disclosed ignition system, it is intended that the specification and examples be considered as exemplary only, with a true scope being indicated by the following claims and their equivalents.

What is claimed is:

1. An ignition system for an engine, comprising:
a pre-combustion chamber in fluid communication with a combustion chamber associated with the engine;
a fuel injection device configured to inject a fuel mixture directly into the pre-combustion chamber;
a spark plug configured to ignite the fuel mixture within the pre-combustion chamber; and
a controller in communication with a primary energy supply and an enhanced energy supply, and configured to:
direct a first current from the enhanced energy supply to the spark plug after the fuel mixture is injected into the pre-combustion chamber; and direct a second current from the primary energy supply to the spark plug, the second current having a frequency that is lower than the first current;

wherein the fuel injection device is a first fuel injection device and the fuel mixture is a first fuel mixture, and the ignition system further includes a second fuel injection device configured to direct a second fuel mixture at a location upstream of the combustion chamber; and wherein ignition of the first fuel mixture within the pre-combustion chamber causes a plurality of flame jets to be directed into the combustion chamber to intersect with the second fuel mixture and ignite the second fuel mixture within the combustion chamber.

2. The ignition system of claim 1, wherein the controller is in communication with the fuel injection device, and further configured to actuate the fuel injection device to cause an air-fuel equivalence ratio of the pre-combustion chamber to be about 1.6-1.7 immediately before ignition of the fuel mixture within the pre-combustion chamber.

3. The ignition system of claim 1, wherein the first current has a frequency that is between about 0.3-300 GHz and the second current has a frequency that is between about 0-50 kHz.

4. The ignition system of claim 1, wherein the enhanced energy supply is a microwave energy supply.

5. The ignition system of claim 1, wherein the enhanced energy supply is a plasma energy supply.

6. A method of initiating combustion within an engine, comprising:
injecting a first fuel mixture directly into a pre-combustion chamber associated with the engine;
directing a first current from an enhanced energy supply to a spark plug associated with the pre-combustion chamber;
directing a second current from a primary energy supply to the spark plug, the second current having a frequency that is lower than the first current;
igniting the first fuel mixture in the pre-combustion chamber;
injecting a second fuel mixture into a main combustion chamber associated with the engine; and
igniting the second fuel mixture within the main combustion chamber;
wherein the second fuel mixture is injected into the main combustion chamber to intersect with a plurality of flame jets emitted from the pre-combustion chamber as a result of ignition of the first fuel mixture within the pre-combustion chamber.

7. The method of claim 6, wherein directing the first current from the enhanced energy supply to the spark plug includes directing the first current from the enhanced energy supply to the spark plug after the first fuel mixture is injected into the pre-combustion chamber.

8. The method of claim 6, wherein directing the second current from the primary energy supply to the spark plug includes directing the second current from the primary energy supply to the spark plug just after the first current is being directed to the spark plug.

9. The method of claim 6, wherein injecting the first fuel mixture into the pre-combustion chamber includes injecting the first fuel mixture into the pre-combustion chamber such that an air-fuel equivalence ratio of the pre-combustion chamber is about 1.6-1.7 immediately before igniting the first fuel mixture within the pre-combustion chamber.

10. The method of claim 6, wherein the enhanced energy supply is a microwave energy supply.

11. The method of claim 6, wherein the enhanced energy supply is a plasma energy supply.

12. The method of claim 6, wherein igniting the first fuel mixture within the pre-combustion chamber includes creating a spark in the pre-combustion chamber via an electrode.

13. An engine, comprising:
an engine block at least partially defining a cylinder;
a piston reciprocatingly disposed within the cylinder to form a combustion chamber;
a pre-combustion chamber in fluid communication with the combustion chamber;
a first fuel injection device configured to direct a first fuel mixture directly into the pre-combustion chamber;
a spark plug configured to ignite the first fuel mixture within the pre-combustion chamber;
a primary energy supply configured to direct a first current to the spark plug;
an enhanced energy supply configured to direct a second current to the spark plug, the second current having a frequency that is lower than the first current;
a controller in communication with the primary energy supply and the enhanced energy supply, and configured to:
direct the first current to the spark plug after the first fuel mixture is injected into the pre-combustion chamber; and
direct the second current to the spark plug just after the first current is directed to the spark plug; and
a second fuel injection device configured to direct a second fuel mixture at a location upstream of the combustion chamber to intersect with a plurality of flame jets emitted from the pre-combustion chamber as a result of ignition of the first fuel mixture within the pre-combustion chamber.

14. The engine of claim 13, wherein the controller is further configured to actuate the first fuel injection device to cause an air-fuel equivalence ratio of the pre-combustion chamber to be about 1.6-1.7 immediately before ignition of the first fuel mixture within the pre-combustion chamber.

15. The engine of claim 13, wherein the first current has a frequency that is between about 0.3-300 GHz and the second current has a frequency that is between about 0-50 kHz.

16. The engine of claim 13, wherein the enhanced energy supply is a microwave energy supply.

17. The engine of claim 13, wherein the enhanced energy supply is a plasma energy supply.

* * * * *